(12) United States Patent
Brickell et al.

(10) Patent No.: US 6,530,088 B1
(45) Date of Patent: Mar. 4, 2003

(54) APPARATUS FOR AUTOMATIC SENSING OF LINE AMPLIFIER CONFIGURATION FOR STATUS MONITORING

(75) Inventors: John W. Brickell, Lawrenceville, GA (US); Wayne H. Nash, Lilburn, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/242,362

(22) PCT Filed: Jun. 2, 1997

(86) PCT No.: PCT/US97/09554

§ 371 (c)(1),
(2), (4) Date: Feb. 11, 1999

(87) PCT Pub. No.: WO97/47093

PCT Pub. Date: Dec. 11, 1997

Related U.S. Application Data

(60) Provisional application No. 60/019,007, filed on Jun. 3, 1996.

(51) Int. Cl.[7] ............................................. H04N 7/16
(52) U.S. Cl. ....................................................... 725/127
(58) Field of Search .................. 725/127, 128, 725/143, 144, 148, 149; 348/192, 193

(56) References Cited

U.S. PATENT DOCUMENTS

| | | |
|---|---|---|
| 3,806,814 A | 4/1974 | Forbes |
| 4,317,010 A | 2/1982 | Fillot |
| 4,418,424 A | 11/1983 | Kawamoto et al. |
| 4,520,508 A | 5/1985 | Reichert, Jr. |
| 4,558,358 A | 12/1985 | Onda |
| 4,794,343 A | 12/1988 | Yang |
| 4,937,535 A | 6/1990 | Underwood et al. |
| 5,020,134 A | 5/1991 | Pecaut |
| 5,194,822 A | 3/1993 | Bureau et al. |
| 5,278,989 A * | 1/1994 | Burke et al. .................. 455/8 |
| 5,313,661 A | 5/1994 | Malmi et al. |
| 5,367,571 A * | 11/1994 | Bowen et al. ................ 380/20 |
| 5,424,677 A | 6/1995 | Carson |
| 5,488,413 A * | 1/1996 | Elder et al. ................... 348/13 |
| 5,513,029 A * | 4/1996 | Roberts ...................... 359/177 |
| 5,555,015 A | 9/1996 | Aguayo, Jr. et al. |
| 5,568,179 A * | 10/1996 | Diehl et al. ................... 348/6 |
| 5,581,397 A * | 12/1996 | Maki et al. ................. 359/341 |
| 5,598,418 A | 1/1997 | Lo et al. |
| 5,657,154 A | 8/1997 | Yoneyama |
| 5,790,294 A * | 8/1998 | Horiuchi et al. ............ 359/177 |
| 5,818,509 A * | 10/1998 | Kim et al. ..................... 348/6 |
| 5,826,167 A * | 10/1998 | Jelinek et al. ............... 455/5.1 |
| 5,835,844 A * | 11/1998 | Stoneback et al. .......... 455/5.1 |
| 5,845,190 A * | 12/1998 | Bushue et al. .............. 455/3.3 |
| 6,002,671 A * | 12/1999 | Kahkosska et al. ......... 370/248 |
| 6,163,395 A * | 12/2000 | Nemecek et al. ........... 359/187 |
| 6,373,622 B1 * | 4/2002 | Kosaka ................... 359/337.13 |

* cited by examiner

Primary Examiner—John Miller
Assistant Examiner—Annan Q. Shang
(74) Attorney, Agent, or Firm—Hubert J. Barnhardt, III; Kenneth M. Massaroni; Shelley L. Couturier

(57) ABSTRACT

An apparatus for indicating the configuration of a cable television line amplifier. The line amplifier contains a controller that senses a preset voltage on a status indication line. When the amplifier is reconfigured, such as by adding new circuits containing new functions or features, these new circuits contain resisters that are shunted to modify the preset voltage level on the appropriate status indication line. The controller senses the modified voltages and provides an indication of the new function of the new circuit to a headend through a cable television distribution system.

12 Claims, 2 Drawing Sheets

APPARATUS FOR AUTOMATIC SENSING OF LINE AMPLIFIER CONFIGURATION FOR STATUS MONITORING

This application claims the benefit of 60/019,007 filed Jun. 3, 1996.

BACKGROUND OF THE INVENTION

This invention relates to an apparatus for sensing the configuration of a cable television line amplifier and more particularly to an apparatus that detects different modules plugged into a line amplifier, and transmits the configuration of the modules to a headend controller.

Line amplifiers are commonly used in cable television distribution systems to extend the range that television signals are transmitted. Line amplifiers contain different modules that have a variety of functions. The functions include automatic gain control (AGC) control, monitoring, reverse path amplification and multiple amplified output ports. With present cable TV distribution systems, the system operator must rely on installation notes from a technician when configuring his line amplifiers. The technician uses the notes to configure the line amplifier by setting jumpers on a module in the line amplifier or by entering data in the memory of the module. Inaccurate notes could result in lost time to set up the line amplifier station. Incorrect entry of the data into the module could result in faulty operation of the amplifier.

SUMMARY OF THE INVENTION

The invention permits a status monitoring module within a line amplifier to be automatically configured upon installation without the technician having to enter data or set jumpers within the module, regardless of the number of module types that are installed. The invention will also allow amplifier configuration changes in the field to be completed electronically and instantaneously without the technician having to change the module switch settings or without requiring the re-entering of data in the module. The status monitor utilizes A/D inputs to read DC voltages supplied by the various modules. These voltages represent the amplifier's configuration. In response to different modules being added to the line amplifier, these voltages would automatically change upon the addition of a module with a new option. A controller within the line amplifier would then read the voltage change and send a signal either over the distribution system to a headend or locally to a test point on the line amplifier indicating a change in the amplifier's configuration.

The foregoing and other objects of the present invention a well as the invention itself, may be more fully understood from the following description when read in conjunction with the accompanying drawings.

DESCRIPTION OF THE PREFERRED EMBODIMENT

Figure 1:
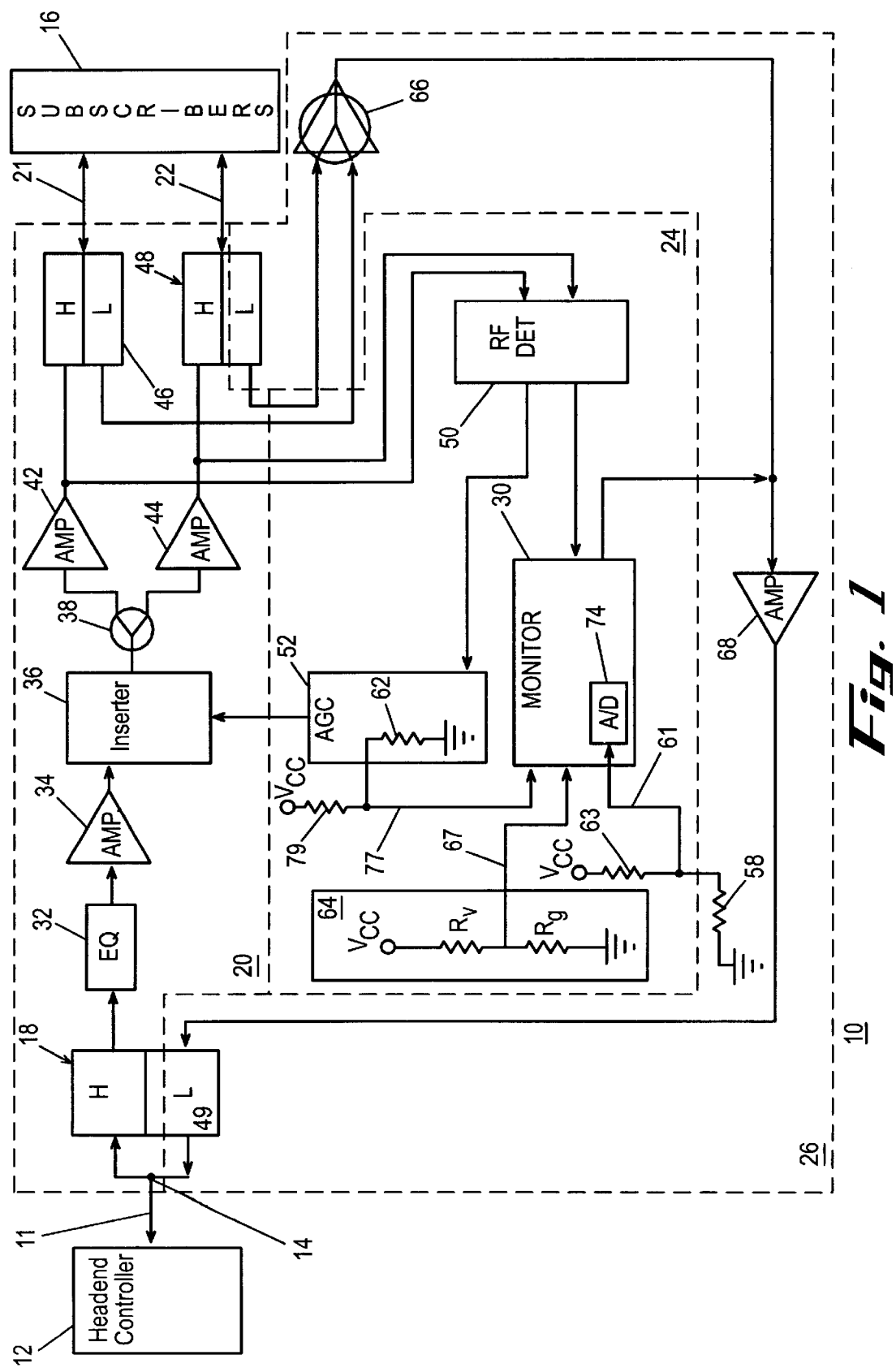
FIG. 1 is a simplified block diagram of a line amplifier implementing the invention.

Referring to FIG. 1, there is shown a dual line amplifier 10 having an input port 14 coupled through cable 11 to a headend controller 12. Amplifier 10 has output ports 21 and 22 coupled to subscribers 16. Amplifier 10 includes amplification circuitry 20, monitoring circuitry 24 and a removable module containing reverse path circuitry 26. Amplification circuitry 20 amplifies the signal on port 14 before feeding it to output ports 21 and 22. Circuitry 24 contains an RF detect circuit 50, status monitor circuitry 30, indicator circuitry 64 and a modularized and removable AGC control circuit 52. Monitoring circuitry 24 determines the configuration of line amplifier circuitry 20, stores this configuration and feeds a signal indicative of the configuration through reverse path circuitry 26 to headend controller 12. Monitoring circuitry 24 internally generates one or more preset signals having a voltage level references. These signals are fed to status monitor circuit 30. The voltage level references of these signals change when the amplifier 10 is reconfigured, thereby providing an indication to status monitor circuit 30 of the current state of the amplifier configuration.

Amplifier 10 receives an RF signal on input port 14 that is fed through high/low filter 18, equalizer 32, and amplified by amplification stage 34. The output of the amplification stage 34 is fed through variable loss inserter 36, or attenuator, and directed through coupler 38 to output amplifiers 42 and 44. The output of amplifiers 42 and 44 are fed through filters 46 and 48, respectively, to output terminals 21 and 22. The outputs of amplifiers 42 and 44 are also fed to monitoring circuitry 24.

Monitoring circuitry 24 contains an RF detector 50 that receives the output signals of amplifiers 42 and 44. The RF detector 50 then feeds the received signal to status monitor circuit 30 and AGC control circuitry 52. As a result of the signal being received from RF detector 50, AGC control circuit 52 adjusts the attenuation of inserter 36, to vary the gain of amplification circuitry 20.

Status monitor circuit 30 receives on line 61 a DC signal having a first reference voltage level. The first voltage level is generated by pull down resistor 58, physically disposed on reverse path circuit 26, and pull up/pull down resistor network 63 disposed on monitoring circuitry 24. Status monitor circuit 30 receives through auto amplifier detect line 67 a DC signal having a second voltage level. The second voltage level is generated by pull up/pull down indicator circuit 64 that is also disposed on monitoring circuit 24. If removable AGC control circuitry 52 is not installed, status monitor circuit 30 is fed a DC signal having a third voltage level on AGC mode line 77. The third voltage level is generated by a pull-up resistor 79. If AGC control circuit 52 is installed, status monitor circuit 30 is fed on line 77 a DC signal having a voltage level set by pull down resistor 62, which is shunted to ground.

Reverse path circuit 26 includes a coupler 66, which receives the reverse path RF signal from filters 46 and 48 and feeds the RF signal through reverse amplifier 68 through reverse filter 49 to headend controller 12. Status monitor circuit 30 feeds a status signal containing an indication of the signals on lines 67, 77, and 61 as well as an indication of the detected output-configuration of amplifier 10. This status signal is fed through reverse amplifier 68 and reverse path filter 49 to the headend controller 12.

Resistors Rv and Rg represent resistors on the motherboard of amplifier 10. Rg is preferably a fixed preset value, and the value of Rv is preferably set as a function of the number of amplifier outputs (i.e., a single, a dual, or a triple output). Resistor 62 is disposed within removable AGC control circuit 52. AGC control circuit 52 may be added to the amplifier 10 either during the amplifier production or after the amplifier 10 has been installed in the field.

Figure 2:
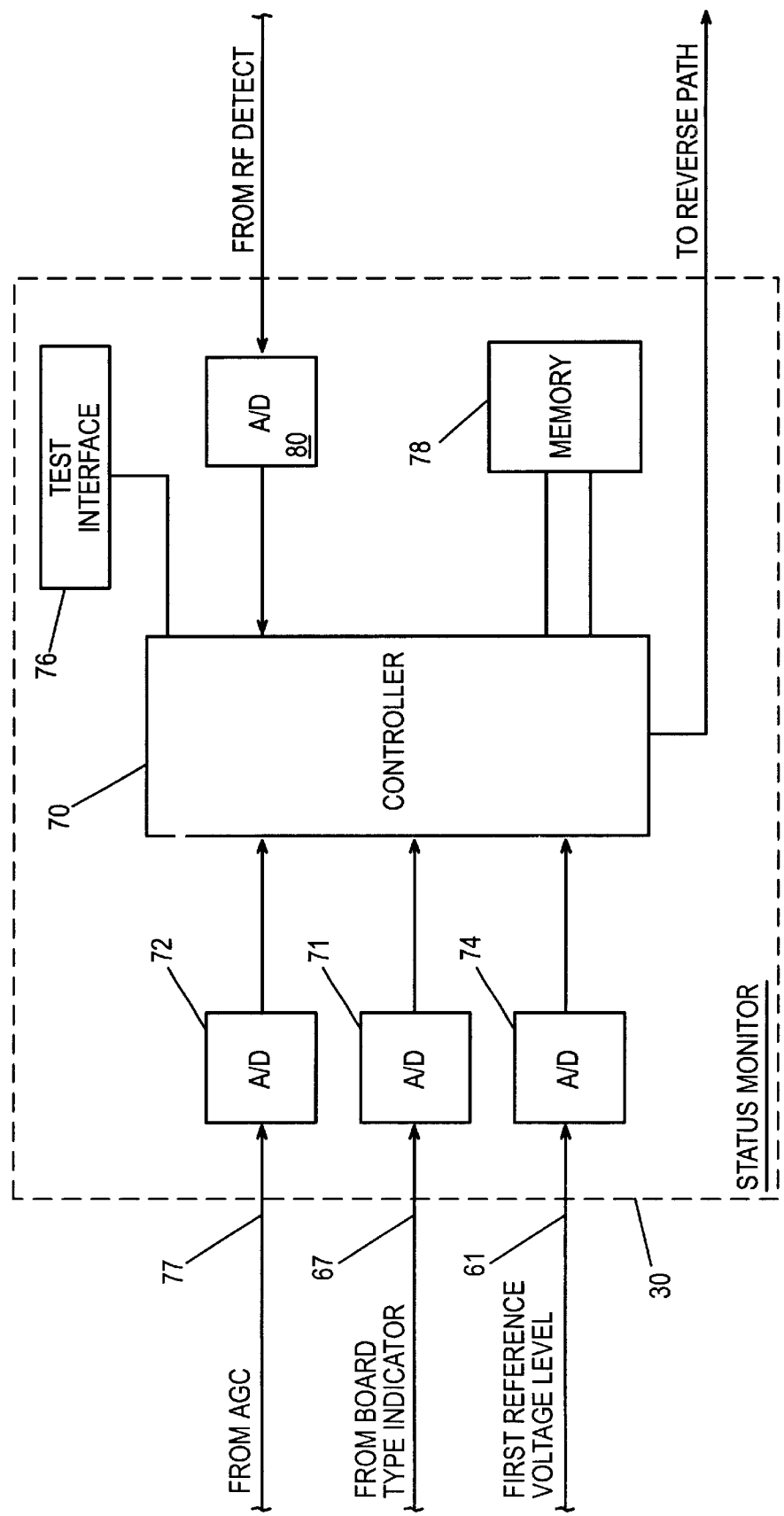
FIG. 2 is a simplified block diagram of the status monitoring device shown in FIG. 1 and incorporating the features of the invention.

Referring to FIG. 2, there is shown the status monitoring circuit 30, having a controller 70 that reads the DC signals from the AGC control circuit 52 through analog-to-digital (A/D) converter 72 and the DC signal from the first reference voltage level 64 through A/D converter 74. Controller 70 reads the DC signal on line 67 through A/D converter 71. Controller 70 is connected to a test interface 76, where the controller 70 sends and receives signals to the test interface 76 to permit a technician to connect test equipment thereto that indicates the AGC control circuit 52 and indicator circuit 64 configuration. Controller 70 uses A/D converter 80 to read values from the RF detector 50, and to read and store the value of the signal from A/D connector 80 and detected RF values into RAM memory 78.

In other alternate embodiments of the invention (not shown), modules having circuits (other than reverse path circuit 26) may be connected into the line amplifier 10, and the configuration and function of these modules may be detected using an auto module type detect circuit. Referring to FIG. 1, the auto module type detect circuit 75 includes A/D converter 74, line 61, and circuit 63. The auto module type detect circuit 75 monitors the type of module (i.e., distribution reverse amplifier or fiber module) that is installed in amplifier 10 and provides a signal to controller 70 (FIG. 2) indicating the presence/absence of such modules. Controller 70 then feeds this signal indicating the presence/absence of such modules to the headend controller 12. This indication will aid in determining the appropriate amplifier configuration for proper system configuration at the headend controller 12. Additional types of modules may be added in the future.

The following tables 1–3 describe exemplary voltage levels of signals detected by the status monitor circuit 30 for the different configurations of the amplifier 10. The status monitor circuit 30 can read the voltage level of these signals and encode the data to inform the headend controller 12 of the amplifier's configuration.

Circuit 75 contains a pull-up/pull-down resistor 63 connected to line 61 to amplifier 10. Also, different values for resistor 58, shunted to ground, will be connected to status monitoring line 61 in each of the modules to indicate different module types. Table 1 indicates preferred voltages for the DC signal on line 61 for the corresponding type of module types. An example module type having reverse path circuitry 26 is shown in FIG. 1.

TABLE 1

Module Option Card Types

| Line 61 Voltage (V) with $V_{cc}$ at +5 V | Module Type |
|---|---|
| 1.38–1.64 | Fiber Module + Reverse Switch |
| 1.85–2.15 | Fiber Module |
| 2.33–2.67 | Reverse Module + Reverse Switch |
| 3.78–4.24 | Reverse Module |

Line 67 is used by the status monitoring circuit 30 to enable monitoring of the output configuration type of amplifier 10 (i.e., single, dual, or triple output) that is installed. Voltage level of the DC signal read on line 67 will aid the controller 70 in determining the amplifier output type for proper amplifier configuration. Additional types of amplifiers may be added in the future. Pull-up resistor (20 kΩ, 1%) Rv should connected to this amplifier detect line 67. Different resistor values, Rg to ground will also be present on this amplifier detect line 67 in the mother board to indicate the different amplifier output types. Table 2 indicates preferred different voltages on the amplifier detect line 67 and the corresponding amplifier output type.

TABLE 2

Amplifier Station Types

| Line 67 Voltage (V) with power at +5 V | Amplifier Type |
|---|---|
| 0.20–0.59 | Single |
| 0.89–1.11 | Dual |
| 1.38–1.64 | Triple |

An AGC mode detect line 77 is used by the status monitoring circuit 30 to detect the presence or absence of the AGC control circuit 52 and will enable the status monitoring circuit 30 to detect if the amplifier's AGC control circuit 52 is in a thermal mode or an auto mode. A pull-up resistor 79 and a shunt resistor 62 is placed on this AGC mode line 77. Resistor 62 will preferably have a value of approximately 80 Ω when AGC control circuit 52 contains the AGC function, and will preferably have a value of approximately 20 kΩ when the AGC control circuit 52 contains a thermal AGC. Additionally, resistor 62 is preferably an open circuit when the AGC function is not present. Table 3 indicates the three possible states and corresponding voltage levels for the DC signals on this AGC mode line 77.

TABLE 3

AGC Operation

| Line Voltage (V) | AGC Operation |
|---|---|
| 4.0–5.0 | No AGC Installed |
| 2.0–3.0 | Thermal |
| 0–1.0 | Auto |

While the principles of the invention have been made clear in the illustrated embodiments, there will be immediately obvious to those skilled in the art many modifications of the structured arrangements, proportions, elements, materials, and components used in the practice of the invention, that are particularly adapted for specific environments and operational requirements without departing from those principals. The appended claims are therefore intended to cover and embrace any such modifications within the limits of the true spirit and scope of the invention.

What is claimed is:

1. A line amplifier for receiving forward and reverse signals and for transmitting amplified forward and amplified reverse signals, the line amplifier having an output configuration that is one of a single output, a dual output, or a triple output for transmitting portions of the amplified forward signals, the line amplifier further including a monitoring circuit for detecting the output configuration and, the line amplifier comprising:

an auto amplifier detect line having an output configuration voltage, wherein the output configuration voltage is indicative of one of the single output, the dual output, or the triple output; and a controller for determining the output configuration based on the output configuration voltage, wherein subsequent to determining the output configuration of the line amplifier, the controller sends a status signal indicating the output configuration along with the amplified reverse signals.

2. The line amplifier of claim 1, further including an amplification circuit having an adjustable gain level for amplifying the forward signals, the line amplifier further comprising:

an RF detector coupled to the output of the amplification circuit for receiving a portion of the forward amplified signals; and a removable AGC control circuit coupled to the RF detector for adjusting the amplification circuit that subsequently adjusts the gain level of the forward signals dependent upon any variations in comparison with the received portion of amplified forward signals, wherein the controller is coupled to the removable AGC control circuit and an AGC voltage source, and wherein the controller receives an AGC voltage that indicates one of the presence and the absence of the removable AGC control circuit, and wherein the controller sends an AGC control circuit status signal along with the amplified reverse signals.

3. The line amplifier of claim 2, wherein when the removable AGC control circuit is present, the controller receives a thermal mode voltage that indicates whether the removable AGC control circuit is a thermal mode AGC control circuit.

4. The line amplifier of claim 2, wherein when the removable AGC control circuit is present, the controller receives an auto mode voltage that indicates whether the removable AGC control circuit is an auto mode AGC control circuit.

5. The line amplifier of claim 1, further including a module type that may be one of a fiber module and reverse switch, a fiber module, a reverse module and a reverse switch, and a reverse module, the line amplifier further including:

a first reference voltage level circuit for providing a module type voltage that is indicative of the included module type to the controller, wherein the controller sends a module type status signal along with the amplified reverse signals.

6. A line amplifier for receiving forward and reverse signals and for transmitting amplified forward and reverse signals, the line amplifier having a configuration, the line amplifier including a monitoring circuit for indicating the configuration to a headend controller, the monitoring circuit comprising:

a status monitor circuit for generating voltages that indicate a specific configuration of the line amplifier;

a controller for receiving the voltages and for transmitting status signals that are a function of the received voltages to the headend controller, whereby the headend controller determines the configuration of the line amplifier via the transmitted status signals.

7. The line amplifier of claim 6, wherein the voltages include an AGC control circuit voltage, an output configuration voltage, and a module type voltage.

8. The line amplifier of claim 7, wherein the AGC control circuit voltage is provided by a removable AGC control circuit.

9. The line amplifier of claim 8, wherein the AGC control circuit voltage is indicative of a thermal mode AGC control circuit.

10. The line amplifier of claim 7, wherein the AGC control circuit voltage is indicative of an auto mode AGC control circuit.

11. The line amplifier of claim 6, wherein the output configuration voltage is indicative of one of a single output configuration, a dual output configuration, and a triple output configuration.

12. The line amplifier of claim 6, wherein the module type voltage is indicative of one of a fiber module and a reverse switch, a fiber module, a reverse module and a reverse switch, and a reverse module.

* * * * *

UNITED STATES PATENT AND TRADEMARK OFFICE
CERTIFICATE OF CORRECTION

PATENT NO. : 6,530,088 B1
DATED : March 4, 2003
INVENTOR(S) : Brickell et al.

It is certified that error appears in the above-identified patent and that said Letters Patent is hereby corrected as shown below:

Column 4,
Line 62, delete "of" between "indicative" and "one" and insert therefore -- to --

Column 6,
Line 27, "delete "7," and insert therefore -- 8, --

Signed and Sealed this

Twelfth Day of August, 2003

JAMES E. ROGAN
*Director of the United States Patent and Trademark Office*